United States Patent Office 3,107,015
Patented Oct. 15, 1963

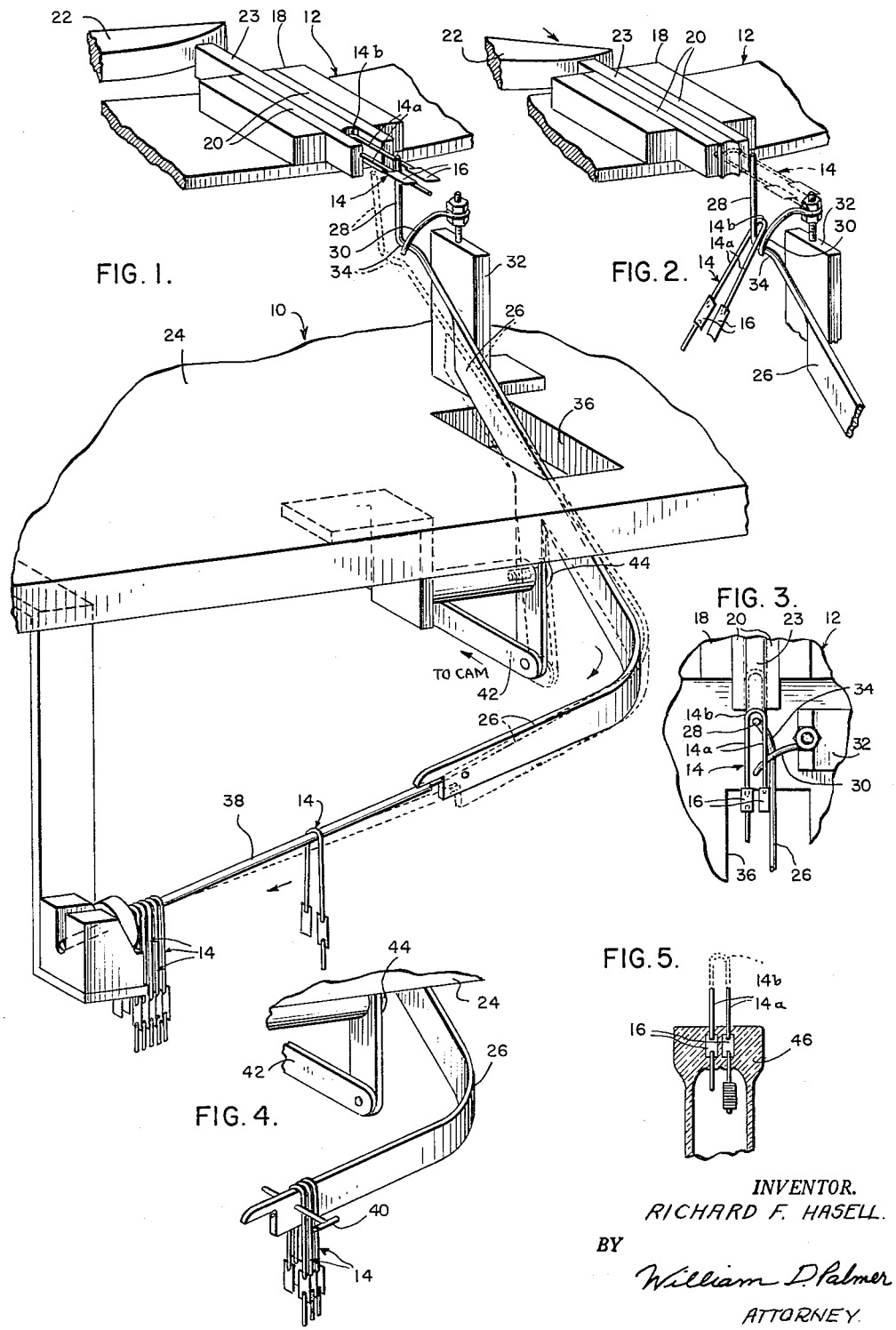

3,107,015
ARTICLE UNLOADING APPARATUS
Richard F. Hasell, Bloomfield, N.J., assignor to Westinghouse Electric Corporation, East Pittsburgh, Pa., a corporation of Pennsylvania
Filed Feb. 16, 1962, Ser. No. 173,659
8 Claims. (Cl. 214—8)

This invention relates to apparatus for unloading articles and, more particularly, to apparatus for unloading hairpin-type electrodes for discharge devices from an electrode fabricating machine and for automatically positioning the unloaded electrodes at an electrode collection point.

Electrodes for discharge devices such as high-pressure, mercury-vapor lamps are usually fabricated in the form of a hairpin, with ribbon-type electrical lead-in conductors positioned near the tips or ends of the hairpin configuration. In fabricating the arc tube portion of the discharge device, a hairpin-type electrode is placed into each end of a quartz tube, with the loop portions of the hairpin structures projecting from each end of the quartz tube. Thereafter, the ends of the quartz tube are pressed down onto the ribbon portions of the electrode structures to form hermetic seals. The loop portions of the hairpins are cut off when completing the fabrication of the arc tube.

In the practices of the prior art, the hairpin electrodes, together with the ribbon conductors, have been fabricated automatically. The automatic fabricating machine did not unload the hairpin electrodes in any semblance of order which would facilitate their cleaning, inspection or transportation to the arc tube fabricating machine. In explanation, the usual practice was to discharge the fabricated electrodes into a container in a random fashion. Since the electrodes are quite fragile, considerable product "shrinkage" was encountered in this operation. In the next operation of the prior art practices, the electrodes were manually picked up with tweezers, properly oriented, and loaded onto a transportation rack for washing and further fabrication, preparatory to incorporation into an arc tube. This procedure was time consuming and expensive.

It is the general object of this invention to provide an apparatus for automatically unloading from an article fabricating machine an article which has the general configuration of a hairpin and for automatically positioning the unloaded article in a predetermined position.

It is another object to provide an apparatus for arresting the motion of a moving article having the general configuration of a hairpin and for positioning such article in a predetermined position.

It is a further object to provide an apparatus for automatically unloading a hairpin-type electrode from an electrode fabricating machine and for automatically positioning the unloaded electrode in a predetermined position for further fabricating operations.

The aforesaid objects of the invention, and other objects which will become apparent as the description proceeds, are achieved by positioning a receiving striker proximate to the unloading station of the electrode fabricating machine. An inclined track connects to the bottom portion of the receiving striker and is inclined away from the receiving striker. There is also provided an inclined turnover striker which is positioned substantially to one side of the inclined track, crosses above the track, and is also inclined toward the track. When the hairpin article or electrode is being discharged from the unloading head of the fabricating machine, the article is moved toward the receiving striker along a predetermined path first to cause the projecting pin portions of the article to pass on either side of the receiving striker. As the article leaves the unloading head, the article drops under the force of gravity and one of the projecting pin portions of the article contacts the turnover striker. The article then moves both under the force of gravity and as guided by the turnover striker first to pass over the track and then to fall to that side of the track which is oppositely disposed to the substantial portion of the turnover striker. In other words, the turnover striker causes the moving article to rotate through 180°. As the now-rotated article falls further, the loop portion of the article contacts the track, with the projecting pin portions dependent from the loop portion of the article and disposed on either side of the inclined track. Thereafter the article slides down the inclined track under the force of gravity to an article collection point for further processing.

For a better understanding of the invention, reference should be had to the accompanying drawings wherein:

FIGURE 1 is a perspective view of the turnover apparatus showing an electrode about to be ejected from the unloading head of the electrode fabricating machine, with the electrode striker elevated into electrode-receiving position;

FIG. 2 is a fragmentary perspective view similar to FIG. 1, showing the electrode after contact with the turnover striker and as it is being rotated on its longitudinal axis through approximately 180°.

FIG. 3 is a fragmentary plan view showing the electrode being discharged from the unloading head of the article fabricating apparatus and also showing the relative positioning of the turnover striker and the receiving striker of the unloading apparatus;

FIG. 4 is a perspective view of the lower portion of the inclined track, as shown in FIG. 1, illustrating how the electrodes are collected during the period when the previously fabricated electrodes are being transported to the next fabricating operation;

FIG. 5 is a fragmentary sectional view of an end portion of the arc tube for a discharge device, showing how the hairpin-type electrode is ultimately incorporated into the arc tube portion of a discharge device.

The present invention has particular utility with respect to unloading hairpin-type electrodes from a machine for fabricating such electrodes and hence it has been so illustrated and will be so described. It should be understood, however, that the present unloading apparatus can be used to unload any type of hairpin-shaped article from an apparatus for fabricating or processing such articles.

With specific reference to the form of the invention illustrated in the drawings, the numeral 10 in FIG. 1 indicates generally the unloading apparatus which is positioned proximate to the unloading station of the electrode fabricating machine 12. The electrode fabricating machine 12 is generally conventional and is designed to fabricate hairpin-type electrodes 14 which comprise two projecting pin portions 14a joined together by a loop portion 14b. Ribbon conductors 16 are positioned proximate to the extremities of the projecting pin portions 14a of the electrode 14 and these ribbon conductors 16 serve to facilitate making a hermetic seal through a vitreous material, such as quartz. The only portion of the electrode fabricating machine 12 which is shown is the unloading head 18 in position at the unloading station. The machine 12 advances with an indexing motion between work stations. The electrode 14 is normally retained in slotted fixed guides 20 in the unloading head 18 and is adapted to be discharged or ejected from the unloading head 18 by means of a cam-actuated lever 22, which acts upon a plunger 23 to eject the electrode 14 from the head 18. The electrode 14 is ejected from the head 18 with the projecting pin portions 14a leading the connecting loop portion 14b of the hairpin configuration. As indicated hereinbefore, the electrode fabricating machine 12 is conventional in design.

The unloading apparatus 10 comprises a stationary table 24 having mounted thereon an inclined track 26 which is movable to an operating or work position. The track 26 terminates at its upper end in an article receiving striker 28. A stationary article turnover striker 30 is positioned by means of a suitable bracket 32 substantially to one side of the track 26, although the turnover striker 30 crosses over the track 26 and is also inclined toward the track 26. The track 26 is sufficiently inclined to permit an electrode 14, when positioned thereon, to slide down the track 26 under the force of gravity to an article collection point.

When the electrode 14 is being discharged from the unloading head 18, it is moved toward the receiving striker 28 to cause the projecting pin portions 14a of the electrode 14 to pass on either side of the receiving striker 28. The positioning of the electrode 14, during the initial ejection from the discharge head 18, is shown in dotted lines FIG. 2. The electrode 14 continues in its predetermined path of ejection until the loop portion 14b of the electrode 14 is about to make contact with the receiving striker 28. The electrode 14 is then released from the discharge head 18. This permits the electrode 14 to drop under the force of gravity and one of the projecting pin portions 14a of the electrode 14 contacts the inclined turnover striker 30. This guides the contacting projecting pin portion 14a so that it first passes over the track 26 and then falls to that side of the track 26 which is oppositely disposed to the substantial portion of the turnover striker 30. During the time the electrode 14 is falling toward the track 26, the electrode striker 28 guides the electrode to insure that the loop portion 14b will contact the track 26. The electrode 14, when falling toward the track 26, is shown in solid lines in FIG. 2. Thus the cooperative action of the receiving striker 28 and the turnover striker 30 causes the electrode literally to "flip" on its longitudinal axis through 180°. In actual operation, the electrode 14 is turned over so fast it is difficult for the eye to follow its motion.

If the electrode 14 were not turned over in the manner as described hereinbefore, it would be next to impossible to place it onto the track 26 with the loop portion 14b resting on the track 26 and the pin portions 14a dependent therefrom on either side of the track 26. To illustrate, if the electrode 14 were not turned over, it would normally fall to the table 24. By converting the generally linear motion of the ejected electrode 14 into an angular motion and permitting the loop portion 14b of the electrode 14 to "ring" around the electrode striker 28, proximate its juncture with the track 26, the electrode 14 is positively positioned on the track 26.

In the illustrated form of the present apparatus, the electrode striker 28 is vertical and the track 26 is bent slightly at 34 toward the turnover striker 30 proximate to the juncture of the track 26 and the electrode striker 28. This bend 34 in the track 26 is shown more clearly in FIG. 3. The purpose of the slight bend 34 in the track 26 is to insure that neither of the fragile ribbon conductors 16 strikes against the track 26 as the turnover striker 30 causes the electrode 14 to flip through 180°. The turnover striker 30 crosses above the elevated track 26 with about one-quarter inch clearance therebetween to permit the positioned electrode 14 to proceed down the track 26. The positioning of the electrode 14, before ejection from the head 18, is shown in dotted lines in FIG. 3 and the electrode positioning just after ejection from the head 18, but before turning, is shown in solid lines in FIG. 3.

After the electrode 14 is positioned on the track 26, it slides down this track 26 under the force of gravity through an aperture 36 in the table 24 to an extension 38 of the track 26, which extension constitutes an electrode collection point.

To facilitate collection of the properly positioned electrodes, and as shown in FIG. 4, the operator places a pin 40 through the track 26 to retain the collected electrodes 14. The extension 38 of the track 26 is then manually removed to transport the electrodes to the next fabricating operation, preparatory to incorporation into an arc tube. Thereafter the track extension 38 is placed back in position, the pin 40 removed and more electrodes are collected for the next fabricating operation.

In the preferred form of the present apparatus, the track 26 and the connecting receiving striker 28 are both depressed when the unloading head 18 is indexed into unloading position, in order to prevent the receiving striker 28 from knocking the electrode 14 out of the unloading head 18. These depressed positions of the track 26 and receiving striker 28 are shown in dotted lines in FIG. 1 and these components are moved into electrode receiving position, as shown in solid lines in FIG. 1, by a cam actuated lever 42 which is pivoted on an extension of the table 24 at point 44.

In FIG. 5 is shown a portion of the sealed arc tube 46, wherein a finished electrode is sealed into one end of the arc tube 46. After sealing, the connecting loop portion 14b of the electrode 14 is cut off so that the resulting individual electrodes are electrically independent.

In the embodiment as shown, the electrode receiving striker 28 is in a substantially vertical position and the electrode 14 is initially moved from the unloading head 18 in a substantially horizontal direction. It should be understood, however, that the striker 28 need not be vertical and the electrode need not be initially ejected in a substantially horizontal direction, provided the receiving striker 28, the turnover striker 30 and the predetermined path of travel of the ejected electrode are so related as to cause the electrode 14 to flip over and "ring" around the receiving striker 28 proximate to its juncture with the track 26.

It will be recognized that the objects of the invention have been achieved by providing an apparatus for automatically unloading from an article fabricating machine a hairpin-shaped article, and preferably an electrode, and automatically positioning the unloaded article or electrode in a predetermined position.

As a possible alternative embodiment, the track 26 could be formed as a continuously moving endless conveyor. In such a construction, the moving track would not need to be inclined.

While one best embodiment of the present invention has been illustrated and described in detail, it is to be particularly understood that the invention is not limited thereto or thereby.

I claim as my invention:

1. Apparatus for arresting the motion of a moving article having the general configuration of a hairpin with two projecting pin portions connected by a loop portion and for positioning such article in a predetermined position, said article moving toward said apparatus in a predetermined path with the projecting pin portions of said article leading the loop portion of said article, said apparatus comprising, an article receiving striker, an inclined track conecting to the bottom portion of said receiving striker and inclined away from said receiving striker, an inclined turnover striker positioned substantially to one side of said track and crossing above said track and inclined toward said track, the predetermined path of said moving article causing the projecting pin portions of said article to pass on either side of said receiving striker, thereafter one of the projecting pin portions of said article contacting said inclined turnover striker and moving under the force of gravity and as guided by said turnover striker first to pass over said track and then to fall to that side of said track which is oppositely disposed to the substantial portion of said turnover striker, said article then falling further under the force of gravity until the loop portion of said article contacts said track with the projecting pin portions of said article dependent from the loop portion of said article and disposed on either side of said track, and thereafter said article sliding down said inclined track under the force of gravity to an article collection point.

2. Apparatus for automatically unloading from an article fabricating machine an article having the general configuration of a hairpin with two projecting pin portions connected by a loop portion, and for automatically positioning such article as unloaded in a predetermined position, said apparatus comprising, an article unloading head, an article unloading station, said unloading head movable to and from said unloading station and operable to discharge said article at said unloading station with the projecting pin portions of said article leading the loop portion of said article, an article receiving striker positioned proximate to said unloading station, an inclined track connecting to the bottom portion of said receiving striker and inclined away from said receiving striker, an inclined turnover striker positioned substantially to one side of said track and crossing above said track and inclined toward said track, said article when being discharged from said unloading head moving toward said receiving striker to cause the projecting pin portions of said article to pass on either side of said receiving striker, thereafter said article separating from said unloading head and falling under the force of gravity to cause one of the projecting pin portions of said discharged article to contact said inclined turnover striker and move under the force of gravity and as guided by said turnover striker first to pass over said track and then to fall to that side of said track which is oppositely disposed to the substantial portion of said turnover striker, said article then falling further under the force of gravity until the loop portion of said article contacts said track with the projecting pin portions of said article dependent from the loop portion of said article and disposed on either side of said track, and thereafter said article sliding down said inclined track under the force of gravity to an article collection point.

3. The apparatus as specified in claim 2, wherein said article fabricating machine moves to and from said unloading station with an indexing motion, and said article is discharged from said unloading station while said machine is stationary between indexes.

4. The apparatus as specified in claim 3, wherein said article receiving striker is depressed during the period said article unloading head is being indexed to said unloading station to prevent said article receiving striker from contacting said article during index of said machine.

5. The apparatus as specified in claim 2, wherein said article collection point constitutes a removable continuation of said track to enable a plurality of transferred articles to be accumulated and removed at one operation in oriented position.

6. The apparatus as specified in claim 2, wherein said article is a hairpin-shaped electrode having ribbon conductors proximate to the pin portions of said electrode, and said article fabricating machine is a machine for fabricating hairpin-shaped electrodes for electric discharge devices.

7. The apparatus as specified in claim 6, wherein said track is laterally bent, proximate to its junction with said article striker, toward that track said which is closest to the substantial portion of said turnover striker, to insure that no ribbon conductor of said electrode contacts said track during electrode turnover.

8. Apparatus for arresting the motion of a moving article having the general configuration of a hairpin with two projecting pin portions connected by a loop portion and for positioning such article in a predetermined position on a track, said article moving toward said apparatus in a predetermined path with the projecting pin portions of said article leading the loop portion of said article, said apparatus comprising, an article receiving striker, the track on which said article is to be positioned connecting to the bottom portion of said receiving striker, an inclined turnover striker positioned substantially to one side of said track and crossing above said track and inclined toward said track, the predetermined path of said moving article causing the projecting pin portions of said article to pass on either side of said receiving striker, thereafter, one of the projecting pin portions of said article contacting said inclined turnover striker and moving under the force of gravity and as guided by said turnover striker first to pass over said track and then to fall to that side of said track which is oppositely disposed to the substantial portion of said turnover striker, and said article then falling further under the force of gravity until the loop portion of said article contacts said track with the projecting pin portions of said article dependent from the loop portion of said article and disposed on either side of said track.

No references cited.